(12) United States Patent
Harrison et al.

(10) Patent No.: US 9,359,087 B2
(45) Date of Patent: *Jun. 7, 2016

(54) VEHICLE CONDITION MONITORING AND REPORTING

(71) Applicant: The Boeing Company, Chicago, IL (US)

(72) Inventors: John E. Harrison, Bellevue, WA (US);
David S. Kinney, Everett, WA (US);
James L. Millar, Seattle, WA (US);
Matthew D. Smith, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/222,321

(22) Filed: Mar. 21, 2014

(65) Prior Publication Data

US 2014/0203952 A1 Jul. 24, 2014

Related U.S. Application Data

(63) Continuation of application No. 12/690,046, filed on Jan. 19, 2010, now Pat. No. 8,730,064.

(51) Int. Cl.
| | | |
|---|---|---|
| *G08B 21/00* | (2006.01) | |
| *B64D 45/00* | (2006.01) | |
| *G08B 23/00* | (2006.01) | |
| *G07C 5/08* | (2006.01) | |

(52) U.S. Cl.
CPC .............. *B64D 45/00* (2013.01); *G07C 5/0808* (2013.01); *G08B 21/00* (2013.01); *G08B 23/00* (2013.01)

(58) Field of Classification Search
CPC ................................ G08B 21/00; G08B 23/00
USPC ...................... 340/945, 963, 438, 971; 701/14
See application file for complete search history.

(56) References Cited

U.S. PATENT DOCUMENTS

| | | | |
|---|---|---|---|
| 4,060,793 A | * | 11/1977 | Bateman ........................ 340/970 |
| 4,943,919 A | | 7/1990 | Aslin et al. |
| 5,948,026 A | | 9/1999 | Beemer, II et al. |
| 6,092,008 A | * | 7/2000 | Bateman .......................... 701/14 |
| 6,115,656 A | | 9/2000 | Sudolsky |
| 6,535,802 B1 | | 3/2003 | Kramer |
| 6,574,537 B2 | | 6/2003 | Kipersztok et al. |
| 6,691,007 B2 | | 2/2004 | Haugse et al. |

(Continued)

FOREIGN PATENT DOCUMENTS

| | | |
|---|---|---|
| GB | 2 477 205 A | 7/2011 |
| WO | 2004044546 A1 | 5/2004 |

OTHER PUBLICATIONS

Combined Search and Examination Report, Great Britain Application No. GB1100944.6, Intellectual Property Office, Great Britain, May 20, 2011, 9 pages.

(Continued)

*Primary Examiner* — Brent Swarthout
(74) *Attorney, Agent, or Firm* — Toler Law Group, PC

(57) ABSTRACT

A method includes receiving, at a computing device, vehicle condition data from a vehicle monitoring system of a vehicle. The method also includes analyzing the vehicle condition data based on a trigger table, and based on a determination that the vehicle condition data satisfies a particular trigger condition specified in the trigger table, adding an entry in an alert evaluation queue.

20 Claims, 4 Drawing Sheets

(56) References Cited

U.S. PATENT DOCUMENTS

| | | |
|---|---|---|
| 7,065,433 B2 | 6/2006 | Basu et al. |
| 7,088,264 B2 * | 8/2006 | Riley .......................... 340/963 |
| 7,230,527 B2 | 6/2007 | Basu et al. |
| 8,730,064 B2 * | 5/2014 | Harrison et al. ............. 340/945 |
| 2003/0135311 A1 * | 7/2003 | Levine .......................... 701/35 |
| 2003/0225492 A1 | 12/2003 | Cope et al. |
| 2005/0288903 A1 | 12/2005 | Jackson et al. |
| 2007/0236366 A1 | 10/2007 | Gur et al. |

OTHER PUBLICATIONS

Notification of Grant from Serial No. GB477205 dated Jun. 11, 2013, Patents Act 1977: Patents Rules 2007, 2 pages.

* cited by examiner

VEHICLE CONDITION MONITORING AND REPORTING

CROSS REFERENCE TO RELATED APPLICATIONS

The present application is a continuation application of and claims priority to U.S. patent application Ser. No. 12/690,046 filed on Jan. 19, 2010, now U.S. Pat. No. 8,730,064 and entitled "VEHICLE CONDITION MONITORING AND REPORTING," the contents of which are expressly incorporated herein by reference in their entirety.

BACKGROUND

The subject matter described herein relates to automated monitoring and reporting of vehicle performance data. Vehicles such as commercial air, marine and land vehicles may include one or more performance monitoring systems that record data regarding various aspects of vehicle operation and performance. For example, the performance data may include a record of performance events that occur during the operation of the vehicle. The performance monitoring system may collect data and report the data to a remote system. Maintenance needs for the vehicle may be determined from the data.

For example, an aircraft may include one or more central maintenance computer (CMC) and/or an aircraft condition monitoring system (ACMS). The central maintenance computer collects, consolidates and reports performance data for the components of the air vehicle. Certain maintenance messages are associated with one or more types of performance data, and are stored in the CMC. When the CMC receives performance data, it analyzes the data to determine if the received data meets the criteria associated with the maintenance messages. If the received data meets the criteria, then the CMC presents the appropriate stored maintenance message to the user via a user interface. An example of a CMC is described, for example, in U.S. Pat. No. 4,943,919 entitled, Central Maintenance Computer System and Fault Data Handling Method.

An ACMS also collects, monitors, records and reports real-time aircraft system data. For example, the data collected by the ACMS is used to perform cabin pressure and temperature monitoring, hard landing detection, flight crew monitoring, and engine monitoring in addition to many other aircraft performance functions. The reported data may be utilized to analyze aircraft performance and trends in aircraft performance, report significant flight events, and troubleshoot faults.

Vehicle designs and components change regularly, as do monitoring and maintenance needs for various vehicle systems. Accordingly, systems and methods for vehicle condition monitoring and reporting which allow for flexibility in defining parameters to evaluate and conditions which trigger an alert may find utility.

SUMMARY

Embodiments of systems and methods in accordance with the present disclosure may provide improved vehicle condition monitoring and reporting. In one embodiment, a computer based method to monitor vehicle conditions comprises defining, in a trigger table, at least one set of logic conditions which may trigger an alert condition, receiving, in a trigger processor, one or more data streams comprising vehicle condition data for a monitored vehicle, adding directives to an alert evaluation queue when the vehicle condition data satisfies at least one set of logic conditions in the trigger table, processing, using an alert evaluation processor, directives in an alert evaluation queue which analyze vehicle condition data and generate an alert when the vehicle condition data satisfies at least one set of alert conditions.

In another embodiment, a computer based system to monitor vehicle conditions comprises a trigger table stored in a tangible computer readable memory which stores at least one set of logic conditions and a trigger processor to receive one or more data streams comprising vehicle condition data for a monitored vehicle and transmit directives to an alert evaluation queue when the vehicle condition data satisfies the at least one set of logic conditions in the trigger table. The system further comprises an alert evaluation processor which process directives in the alert evaluation queue to generate an alert when the vehicle condition data satisfies the at least one set of alert conditions.

In a further embodiment, a computer program product comprises logic instructions stored on a computer readable medium which, when executed, configure a processor to monitor vehicle conditions by performing operations comprising defining, in a trigger table, at least one set of logic conditions which may trigger an alert condition, receiving, in a trigger processor, one or more data streams comprising vehicle condition data for a monitored vehicle, adding directives to an alert evaluation queue when the vehicle condition data satisfies at least one set of logic conditions in the trigger table, processing, using an alert evaluation processor, directives in an alert evaluation queue which analyze vehicle condition data and generate an alert when the vehicle condition data satisfies at least one set of alert conditions.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

Embodiments of methods and systems in accordance with the teachings of the present disclosure are described in detail below with reference to the following drawings.

DETAILED DESCRIPTION

Systems and methods for vehicle condition monitoring and reporting are described herein. Specific details of certain embodiments are set forth in the following description and in FIGS. 1-4 to provide a thorough understanding of such embodiments. One skilled in the art will understand, however, that alternate embodiments may be practiced without several of the details described in the following description.

Figure 1:
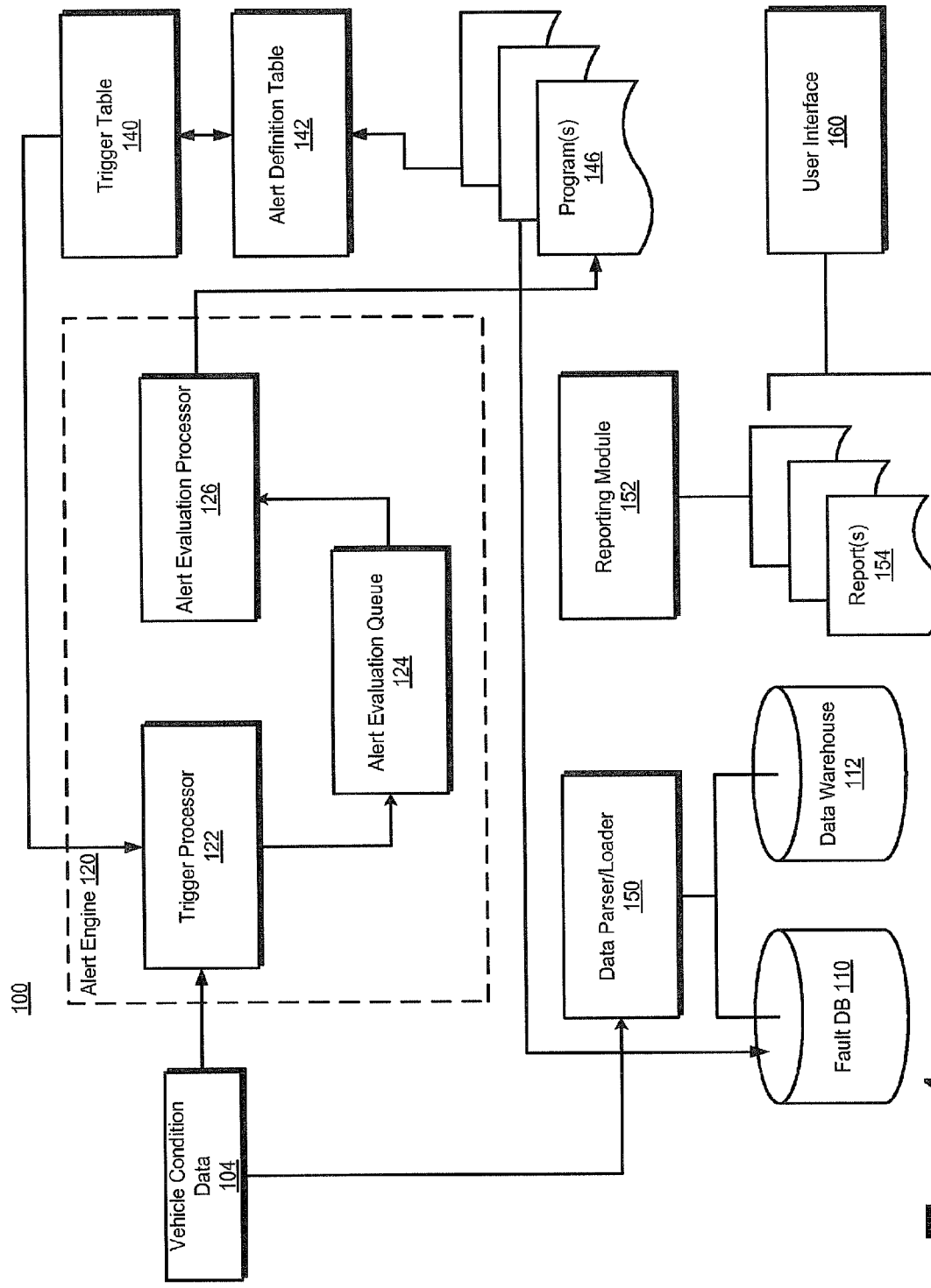
FIG. 1 is a schematic illustration of a system for vehicle condition monitoring and reporting according to embodiments.

FIG. 1 is a schematic illustration of a system 100 for vehicle condition monitoring and reporting according to embodiments. Referring to FIG. 1, in one embodiment the system 100 comprises multiple data stores, or databases, including a fault database 110, and a data warehouse 112. In some embodiments, the system 100 further comprises an alert engine 120, which in turn comprises a trigger processor 122, an alert evaluation queue 124, and an alert evaluation processor 126. The system 100 further comprises a trigger table 140, an alert definition table 142, and one or more programs 146 for alert evaluation and registration. The system 100 further comprises a data parser/loader 150, a reporting module 152 capable of generating one or more reports 154 and may comprise a user interface 160.

In some embodiments the vehicle condition data 104 may comprise data identifying a particular vehicle and data relating to one or more conditions associated with a vehicle. In the context of an aircraft, vehicle condition data may comprise an aircraft identifier, data pertaining to the aircraft location, flight number, flight leg, attitude, speed, and data related to one or more of the aircraft systems, as described above. The trigger processor 122, the alert evaluation processor 126, the data parser/loader 150, and the reporting module 152 may be implemented as logic instructions stored on a computer readable medium and executable by a processor, e.g., software. The alert evaluation queue 124 may be implemented as a first-in first-out (FIFO) queue stored in a computer readable memory.

The trigger table 140 and the alert definition table 142 may be embodied as modular components which are functionally separate from the alert engine 120. In some embodiments the trigger table 140 and the alert definition table 142 may be implemented as Boolean logic entries encoded in a computer readable medium and executable on a processor. By way of example, in one embodiment the trigger table 140 and the alert definition table 142 may be implemented on one or more programmable cells, e.g., a spreadsheet. A series of logical tests may be positioned in the various cells of the spreadsheets, each of which will produce a particular value when the logical tests are true and will produce a particular value when the logical tests are true or false.

In some embodiments an alert trigger table 140 can be defined with a formatted spreadsheet, in which each row in the trigger table 140 represents a named trigger condition and each column in the trigger table 140 represents a unique trigger state. In one embodiment the following trigger states are defined: receipt of a message from a specific airline, receipt of a message from a specific model of airplane, receipt of a message from a specific airplane, receipt of a message from an airplane associate with a given named group of airplanes. In further embodiment the trigger states may be indicative of receipt of a message indicating that the airplane has left the gate, left the ground, landed on the ground, entered the gate, received a specifically named ACMS/F report, received a specifically named ACARS message, received a specific Flight Deck Effect, or received a specific maintenance message.

In some embodiments the various data stores 110, 112 may be implemented as databases or as flat files stored on a computer readable medium. The data warehouse 112 may be used to store various data collected by the system 100, while the fault database 110 may be used to house data related to faults collected by the system 100. The data in both the fault database 110 and the data warehouse 112 may be stored in a suitable computer readable storage medium, e.g., a magnetic storage medium, an optical storage medium, or combinations thereof.

In some embodiments the program(s) 146 for alert evaluation and registration may be implemented as scripts, or stand-alone executable files which may be called by the alert engine 120. In operation, the alert evaluation processor 126 may invoke program(s) 146 that apply logic test to the data forwarded from the alert evaluation queue 124 to the alert evaluation processor to determine whether the data represents a fault or a flaw which should be recorded in the fault database 110. The programs 146 may utilize parameters from the alert definition table 142 as inputs. In general, all information the programs use for alert evaluation and registration is external to the alert engine 120.

Figure 2:
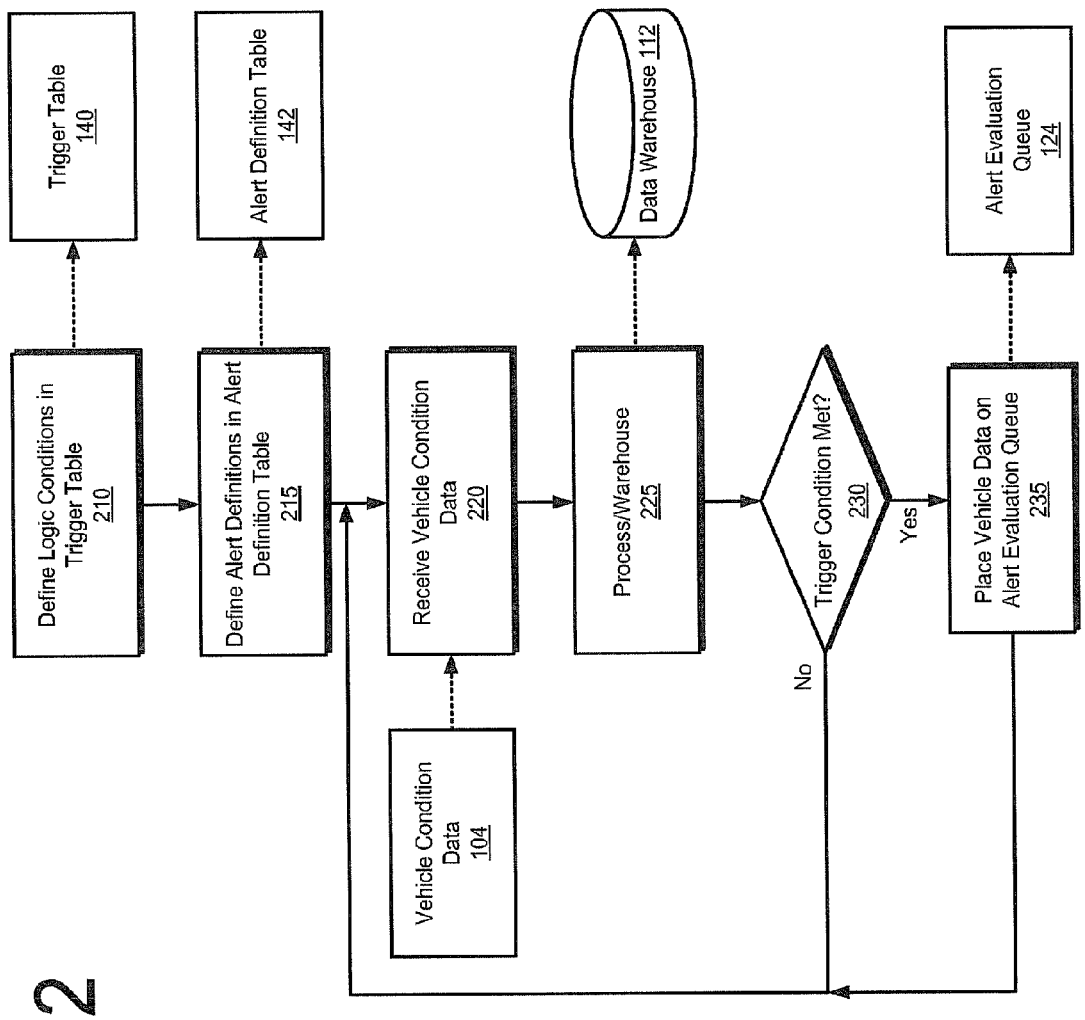
FIG. 2 is a flowchart illustrating operations in a method for vehicle condition monitoring and reporting according to embodiments.

Having described the various components of a system 100 for vehicle condition monitoring and reporting, various operations of the system will now be described. FIG. 2 is a flowchart illustrating operations in a method for vehicle condition monitoring and reporting according to embodiments. Referring now to FIG. 2, at operation 210 one or more logic conditions that define when a particular set of condition inputs may trigger an alert evaluation are defined in the trigger table 140. As described above, in some embodiments the logic conditions may be input as logic tests into programmable cells in a spreadsheet. By way of example, the logic conditions may comprise logic tests involving one or more elements of the vehicle condition data 104 which is input to the system. Solely by way of example, and not limitation, a particular airline may elect to evaluate alert conditions for a particular aircraft or group of aircraft departing from a specific airport. In this instance, one cell of the trigger table 140 may be populated with a logic test that generates a logical value (e.g., a Boolean 1) in response to an input in the vehicle condition data 104 that originates from the particular aircraft and the particular airport identified in the logic test. One skilled in the art will recognize that numerous logical test(s) may be implemented in the trigger table 140.

Similarly, at operation 215 one or more alert definitions are defined in the alert definition table 142. As described above, in some embodiments the alert definitions may be defined as logic tests written with a computer programming language which operates on one or more elements of the vehicle condition data 104 which is input to the system. Alert definitions may also comprise static information which describes how an alertable condition should be formatted for the end-user of the system. Again, solely by way of example and not limitation, a particular airline may elect to trigger an alert for a particular aircraft or group of aircraft when the engine oil quantity in an engine drops below a particular threshold. In this instance, one cell of the alert definition table 142 may be populated with a reference to an external program 146, that, when executed by the Alert Evaluation Processor 126 generates and alerted state in response to an input in the vehicle condition data 104 that indicates that the oil quantity in an engine is below the threshold. Furthermore, given the alert state the alert program will register the alert for presentation to the end-user of the system.

One skilled in the art will recognize that the logical test(s) implemented in Programs 146 may be made more or less complex. In some embodiments, an alert definition may include one or more of the following attributes: an Alert Code or Number, an application airplane model, the date that the respective alert was last edited, an alert title string, an alert description string, an alert type definition, an alert group definition string that controls if two or more related alerts should be presented to the end-user as a grouped fault item, a named data collection group that defines the time during the flight that the alert is evaluated at, a "ParameterName" field that can be used to associate the alert with a one or more named groups of airplanes and/or user-definable alert trigger levels, an Air Transport Associate chapter that the alert is associated with, an alert priority, one or more alert filter parameters that define the occurrence rate, if any, that must exist before the alert is presented to the end-user. aIn further embodiments the alert definition may include one or more fields used in the event that the alert description presented to the end-user include a plot, including the following: an X-axis label, a Y-axis label, a chart title, an alert confidence value. In further embodiments, the alert definition table may include one or more flags indicating the respective alert should be delivered to the end-user as part of a specific product module, including: systems monitoring, airplane performance monitoring, service and alerting, exceedances, real-time (a.k.a., Standard), the position on the airplane, if any, associated with the alerted system/asset, the type of Output Display format (packaging) used to present the respective alert to the end user, the name of the Trigger Condition that is being used to trigger an evaluation not the respective alert, an Alert Action string which defines the standalone executable program 146, and any required calling arguments, that must be executed to evaluate if an alertable condition has been met and if so, to register the alert in the Alert Evaluation Queue 124.

At operation 220 the system 100 receives vehicle condition data 104. As described above, the vehicle condition data may be generated by one or more on-board vehicle monitoring systems and transmitted to the system 100 via a suitable communication link, e.g., a wireless communication system such as the Aircraft Communications Addressing and Reporting System (ACARS) system or the Aeronautical Telecommunications Network (ATN) system. One skilled in the art will recognize that other communication networks may be used to transmit the vehicle condition data 104 to the system.

At operation 225 the vehicle condition data 104 is parsed and/or processed by the data parser/loader module 150. In some embodiments the vehicle condition data 104 may be stored in a data warehouse 112, which may be implemented as a conventional database or other data storage system. The vehicle condition data may be stored for a limited period of time or for an extended duration.

At operation 230 the trigger processor 122 evaluates received data to determine whether a trigger condition has been met. In some embodiments the trigger processor 122 applies one or more logic conditions from the trigger table 140 to the received data to determine whether a directive to evaluate the received data should be placed on the alert evaluation queue 124 for subsequent evaluation by the alert evaluation processor 126. If, at operation 230, the received data does not trigger an alert evaluation then control passes back to operation 220 and the system 100 waits to receive additional vehicle condition data 104 for evaluation.

By contrast, if at operation 230 the received data triggers an alert evaluation than control passes to operation 235 and a directive which reference a specific alert definition in the Alert Definition table 142 is placed on the alert evaluation queue 124, where it is available for inspection by the alert evaluation processor 126. Thus, the operations 220-235 define a loop by which the trigger processor 122 can repeatedly inspect incoming vehicle condition data 104 and make a determination regarding when the incoming data has resulted in a condition where further evaluation should be performed to determine whether the data should trigger an alert for presentation to the end-user. When such conditions are reached, directives and/or links to one or more alerts definitions in the alert definition table are placed on the alert evaluation queue 124. The alert evaluation processor 126 may execute the alert evaluation programs 146 substantially in real time.

Figure 3:
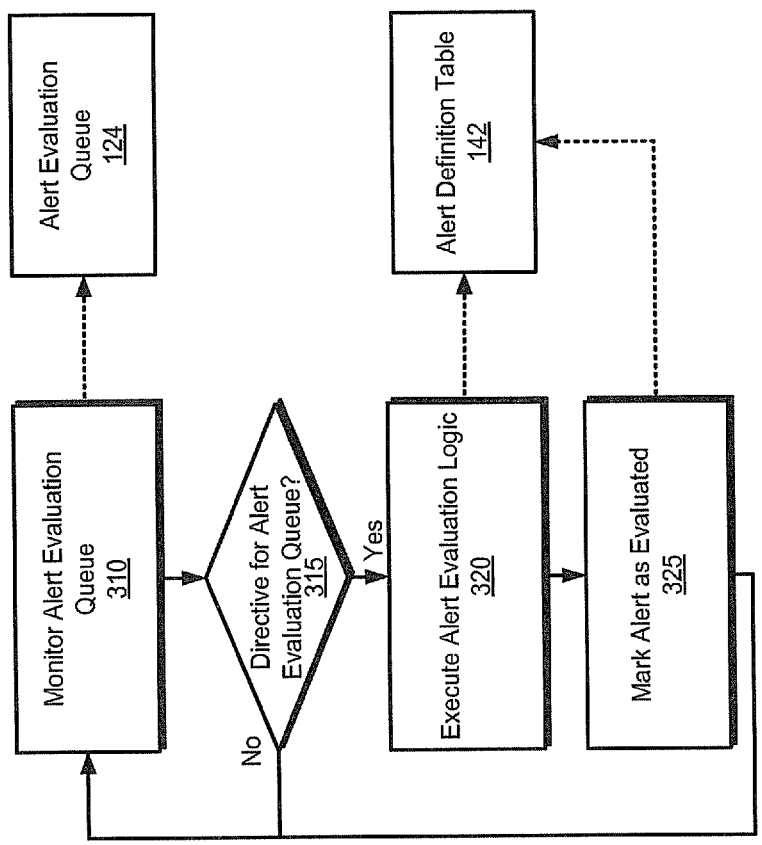
FIG. 3 is a flowchart illustrating operations for creating a mission in a system for vehicle condition monitoring and reporting according to embodiments.

Operations implemented by the alert evaluation processor 126 to execute the alert evaluation programs 146 are explained with reference to FIG. 3. Referring to FIG. 3, at operation 310 the alert evaluation processor 126 monitors the alert evaluation queue 124. If, at operation 315, there are no directives for alert evaluations in the queue, then control passes back to operation 310 and the alert evaluation processor 126 continues monitoring the alert evaluation queue 124. By contrast, if at operation 315 there is a directive in the alert evaluation queue 124, then control passes to operation 320 and the alert evaluation processor 126 executes alert evaluation logic defined in the respective program 146. In some embodiments the alert evaluation processor 126 may invoke one or more external programs 146, which apply logical operations to the vehicle condition data and the alert definitions in the alert definition table. At operation 325 the alert is marked as having been evaluated in the alert definition table 142. Facilities exist to mark any previously evaluated alert as "un-evaluated" to support debug and testing of alerts under development.

Thus, the operations 310 through 325 define a loop by which the alert evaluation processor 126 may execute directives placed on the alert evaluation queue 124 to execute programs 146 which determine whether the vehicle condition data represents an alert condition. The alert evaluation programs 146 examine the vehicle condition data to determine if alertable conditions exist, and, if so, register the respective alert in the fault database 110 for presentation to the end-user.

In combination, the operations depicted in FIGS. 2 and 3 enable the system depicted in FIG. 1 to receive vehicle condition data 104 from one or more vehicles, to determine if the right conditions exist to evaluation one or more alerts, and then to evaluate the alerts using the data 104 to determine whether the data should trigger an alert. If an alert condition is detected, information which documents the alerted state is recorded in a fault database 110. In addition, the alert, with or without the data 104, may be transmitted to a remote computer system for further processing. By way of example, in some embodiments the alert may be transmitted to a maintenance system such that maintenance personnel can use the alert information to perform maintenance on the vehicle.

Figure 4:
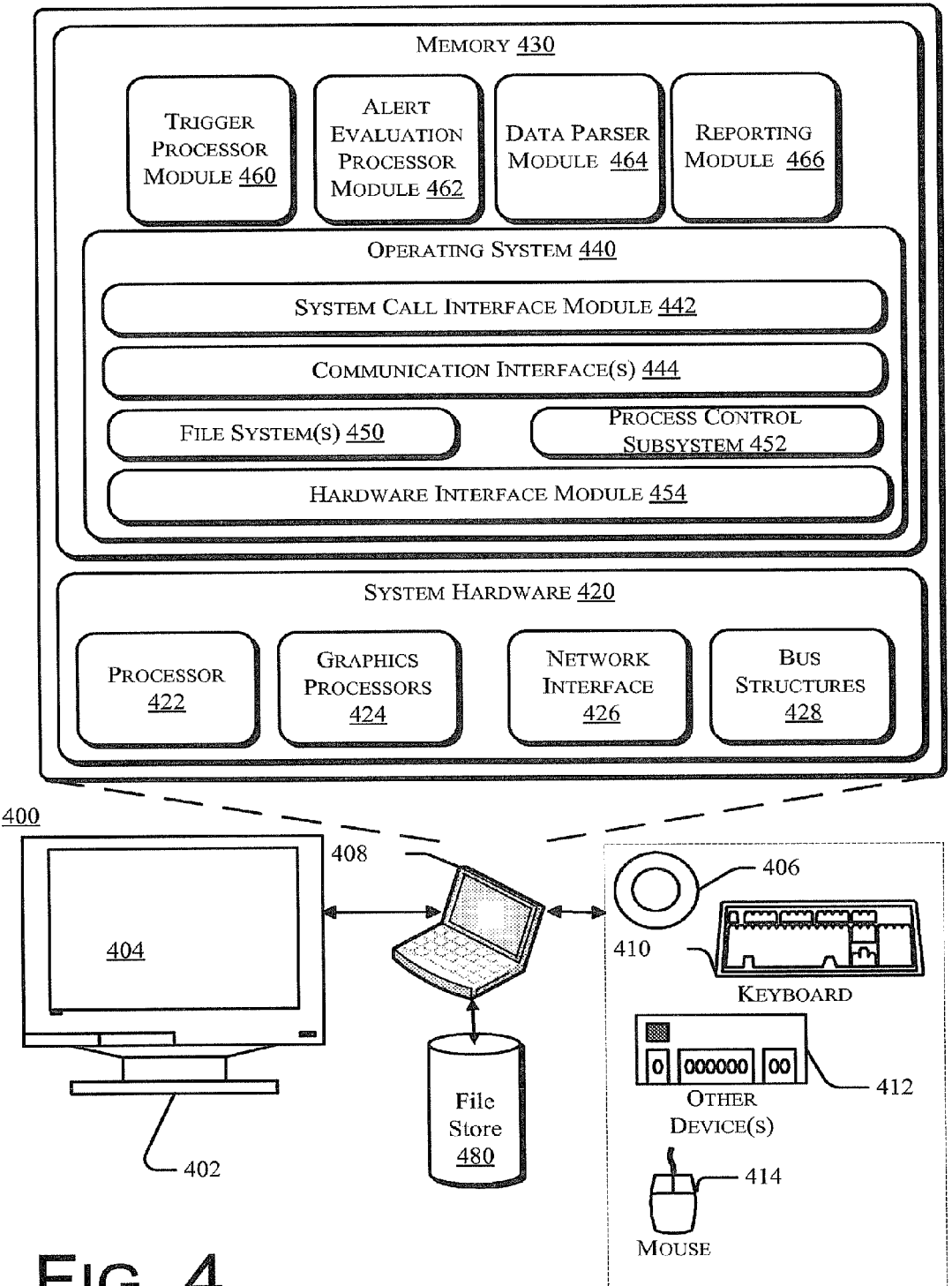
FIG. 4 is a schematic illustration of a computing device which may be adapted to implement a system and method for vehicle condition monitoring and reporting in accordance with some embodiments.

In some embodiments the system depicted in FIG. 1 may be implemented in a computer system environment. FIG. 4 is a schematic illustration of a computing device which may be adapted to implement a system for monitoring and reporting of vehicle performance data in accordance with some embodiments. In one embodiment, system 400 includes a computing device 408 and one or more accompanying input/output devices including a display 402 having a screen 404, one or more speakers 406, a keyboard 410, one or more other I/O device(s) 412, and a mouse 414. The other I/O device(s) 412 may include a touch screen, a voice-activated input device, a track ball, and any other device that allows the system 400 to receive input from a user.

The computing device 408 includes system hardware 420 and memory 430, which may be implemented as random access memory and/or read-only memory. A file store 480 may be communicatively coupled to computing device 408. File store 480 may be internal to computing device 108 such as, e.g., one or more hard drives, CD-ROM drives, DVD-ROM drives, or other types of storage devices. File store 180 may also be external to computer 408 such as, e.g., one or more external hard drives, network attached storage, or a separate storage network.

System hardware 420 may include one or more processors 422, a two graphics processor(s) 424, network interfaces 426, and bus structures 428. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit.

Graphics processor(s) 424 may function as adjunct processors that manage graphics and/or video operations. Graphics processor(s) 424 may be integrated onto the motherboard of computing system 400 or may be coupled via an expansion slot on the motherboard.

In one embodiment, network interface 426 could be a wired interface such as an Ethernet interface (see, e.g., Institute of Electrical and Electronics Engineers/IEEE 802.3-2002) or a wireless interface such as an IEEE 802.11a, b or g-compliant interface (see, e.g., IEEE Standard for IT-Telecommunications and information exchange between systems LAN/MAN-Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Bus structures 428 connect various components of system hardware. In one embodiment, bus structures 428 may be one or more of several types of bus structure(s) including a memory bus, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

Memory 430 may include an operating system 440 for managing operations of computing device 408. In one embodiment, operating system 440 includes a hardware interface module 454 that provides an interface to system hardware 420. In addition, operating system 440 may include a file system 450 that manages files used in the operation of computing device 408 and a process control subsystem 452 that manages processes executing on computing device 408.

Operating system 440 may include (or manage) one or more communication interfaces that may operate in conjunction with system hardware 420 to transceive data packets and/or data streams from a remote source. Operating system 440 may further include a system call interface module 442 that provides an interface between the operating system 440 and one or more application modules resident in memory 130. Operating system 440 may be embodied as a Windows.®. brand operating system or as a UNIX operating system or any derivative thereof (e.g., Linux, Solaris, etc.), or other operating systems.

In various embodiments, the computing device 408 may be embodied as a computer system such as a personal computer, a laptop computer, a server, or another computing device.

In one embodiment, memory 430 includes a trigger processor module 460 and an alert evaluation processor module 462 to implement the operations described with reference to FIGS. 2 and 3. In one embodiment, memory 430 further includes a data parser module 464 to parse data vehicle condition data 104 received in the system, and a reporting module 466 to generate one or more reports compiled from the vehicle condition data 104. The respective modules 460, 462, 464, 466 may include logic instructions encoded in a computer-readable medium which, when executed by processor 422, cause the processor 422 to monitor the condition and performance of a vehicle by performing the operations depicted in FIGS. 2-3.

Thus, described herein is a computer based system and method to monitor vehicle conditions and performance data. In brief, the system receives vehicle condition data such as, e.g., measurements taken in different locations and under different operating conditions in an aircraft or other vehicle. A trigger processor 122 applies one or more logical operations defined in a trigger table 140 to the received data to determine whether the vehicle is in the correct state to evaluate whether one or more alertable conditions exist. A directive to evaluate an alert is placed on an alert evaluation queue 124. An alert evaluation processor 126 monitors the alert evaluation queue 124 and invokes one or more external programs 146 to apply information from an alert definition table 142 to determine whether the data should trigger an alert. If an alert is triggered the data is recorded in a fault database 110 by the programs 146 and may be forwarded to a remote computer system such as, e.g., a maintenance system.

The trigger table 140 and the alert definition table 142 may be implemented in a programmable spreadsheet. The programs 146 which are invoked by the alert evaluation processor 126 may be implemented as stand-alone programs. The modular design of the system i.e., the trigger table 140, the alert definition table 142, and the programs 146 are implemented outside the core of the system 100, facilitates the addition of new triggers, alert definitions and programs to the system. New triggers and alert definitions can be added by adding to the spreadsheets, and new classes of logical tests may be implemented by adding a new program 146 to be invoked by the alert evaluation processor 126. Thus, the modifications and/or expansions to the system do not require modifications of the alert engine 120.

In the foregoing discussion, specific implementations of exemplary processes have been described, however, it should be understood that in alternate implementation, certain acts need not be performed in the order described above. In alternate embodiments, some acts may be modified, performed in a different order, or may be omitted entirely, depending on the circumstances. Moreover, in various alternate implementations, the acts described may be implemented by a computer, controller, processor, programmable device, firmware, or any other suitable device, and may be based on instructions stored on one or more computer-readable media or otherwise stored or programmed into such devices (e.g. including transmitting computer-readable instructions in real time to such devices). In the context of software, the acts described above may represent computer instructions that, when executed by one or more processors, perform the recited operations. In the event that computer-readable media are used, the computer-readable media can be any available media that can be accessed by a device to implement the instructions stored thereon.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method comprising:
receiving, at a computing device, vehicle condition data from a vehicle monitoring system of a vehicle;
analyzing the vehicle condition data based on a trigger table;
based on a determination that the vehicle condition data satisfies a particular trigger condition specified in the trigger table, adding an entry in an alert evaluation queue;
after adding the entry, retrieving the entry from the alert evaluation queue;
analyzing the entry based on an alert definition table, wherein analysis of the vehicle condition data based on the trigger table is performed asynchronously with analysis of the entry based on the alert definition table;
based on a determination that the entry satisfies a particular alert condition specified in the alert definition table, generating an alert based on the particular alert condition; and
transmitting an output to a maintenance system, wherein the output includes the alert.

2. The method of claim 1, wherein the trigger table is distinct from the alert definition table.

3. The method of claim 1, wherein the entry is analyzed by an alert evaluation processor, and wherein the alert evaluation processor is configured to call one or more evaluation programs based on the particular alert condition.

4. The method of claim 1, wherein the particular trigger condition is distinct from the particular alert condition.

5. The method of claim 1, wherein a first processor analyzes the vehicle condition data, wherein a second processor analyzes the entry, and wherein the first processor operates independently of the second processor.

6. The method of claim 1, wherein the vehicle condition data indicates that oil in an engine of an aircraft associated with the vehicle data is below a threshold.

7. The method of claim 1, wherein the alert evaluation queue is a first-in-first-out queue.

8. The method of claim 1, wherein the particular alert condition identifies a particular aircraft, and wherein the entry does not satisfy the particular alert condition when the vehicle is distinct from the particular aircraft.

9. The method of claim 1, wherein the particular trigger condition indicates receipt of a message from a specific airline; receipt of a message from a specific model of aircraft; receipt of a message from a first aircraft associated with a specified group of aircraft; receipt of a message indicating that a particular aircraft associated with the vehicle condition data has left a gate, has left ground, has landed, or has entered the gate; receipt of a specific aircraft condition monitoring system report; receipt of an aircraft communications addressing and reporting system message; receipt of a flight deck effect; receipt of a maintenance message; or a combination thereof.

10. A system comprising:
at least one processor; and
memory accessible to the at least one processor, the memory storing instructions executable by the at least one processor to cause the at least one processor to perform operations comprising:
receiving vehicle condition data from a vehicle monitoring system of a vehicle;
analyzing the vehicle condition data based on a trigger table;
based on a determination that the vehicle condition data satisfies a particular trigger condition specified in the trigger table, adding an entry in an alert evaluation queue;
after adding the entry, retrieving the entry from the alert evaluation queue;
analyzing the entry based on an alert definition table, wherein analysis of the vehicle condition data based on the trigger table is performed asynchronously with analysis of the entry based on the alert definition table;
based on a determination that the entry satisfies a particular alert condition specified in the alert definition table, generating an alert based on the particular alert condition; and
transmitting an output to a maintenance system, wherein the output includes the alert.

11. The system of claim 10, wherein the operations further comprise adding a trigger condition to the trigger table by adding a row to the trigger table.

12. The system of claim 10, wherein the trigger table is distinct from the alert definition table.

13. The system of claim 12, wherein the operations further comprise adding an alert condition to the alert definition table by adding a row including information to invoke one or more evaluation programs to the alert definition table.

14. The system of claim 12, wherein the entry based on the alert definition table is analyzed by invoking one or more stand-alone evaluation programs based on the particular alert condition.

15. The system of claim 12, wherein generating the alert includes sending a report to a remote computing device.

16. The system of claim 10, wherein the particular alert condition identifies a particular aircraft, and wherein the entry does not satisfy the particular alert condition when the vehicle is distinct from the particular aircraft.

17. The system of claim 10, wherein the vehicle condition data is analyzed by comparing fields of the vehicle condition data to logical rules defined in entries of the trigger table.

18. The system of claim 10, wherein the alert evaluation queue is a first-in-first-out queue.

19. A non-transitory computer readable medium storing instructions executable by a processor to cause the processor to perform operations comprising:
receiving vehicle condition data from a vehicle monitoring system of a vehicle;
analyzing the vehicle condition data based on a trigger table;
based on a determination that the vehicle condition data satisfies a particular trigger condition specified in the trigger table, adding an entry in an alert evaluation queue;
after adding the entry, retrieving the entry from the alert evaluation queue;
analyzing the entry based on an alert definition table, wherein analysis of the vehicle condition data based on the trigger table is performed asynchronously with analysis of the entry based on the alert definition table;
based on a determination that the entry satisfies a particular alert condition specified in the alert definition table, generating an alert based on the particular alert condition; and
transmitting an output to a maintenance system, wherein the output includes the alert.

20. The non-transitory computer readable medium of claim 19, wherein the trigger table is distinct from the alert definition table.

* * * * *